(12) United States Patent
Lee

(10) Patent No.: US 8,520,315 B2
(45) Date of Patent: Aug. 27, 2013

(54) ZOOM PROJECTION LENS

(75) Inventor: Tsan-Haw Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 156 days.

(21) Appl. No.: 13/184,668

(22) Filed: Jul. 18, 2011

(65) Prior Publication Data

US 2012/0019927 A1 Jan. 26, 2012

(30) Foreign Application Priority Data

Jul. 20, 2010 (TW) .............................. 99123830 A

(51) Int. Cl.
*G02B 15/14* (2006.01)
*G02B 15/177* (2006.01)

(52) U.S. Cl.
CPC .............. *G02B 15/14* (2013.01); *G02B 15/177* (2013.01)
USPC .......................................... 359/682; 359/691

(58) Field of Classification Search
CPC ........ G02B 15/00; G02B 15/14; G02B 15/16; G02B 15/161; G02B 15/177

USPC .......................................... 359/676, 680–682
See application file for complete search history.

(56) References Cited

U.S. PATENT DOCUMENTS

2011/0013071 A1* 1/2011 Lin .............................. 348/345

* cited by examiner

*Primary Examiner* — Darryl J Collins
(74) *Attorney, Agent, or Firm* — Trop Pruner & Hu, P.C.

(57) ABSTRACT

A zoom projection lens includes a first lens set and a second lens set arranged in sequence from an object side to an image side of the zoom projection lens. The first lens set has a negative optical power. The second lens set has a positive optical power. The first lens set has a first lens. The second lens set has a second lens, a third lens, a fourth lens, and an aperture stop disposed between the second lens and the third lens. The first lens is an aspherical plastic lens. One of the third and fourth lenses is an aspherical glass lens. The zoom projection lens satisfies: $1.463 < |tt/lt| < 1.505$, in which, tt represents an overall length of the zoom projection lens, and lt represents a length of the zoom projection lens from the object side of the first lens to an image side of the fourth lens.

15 Claims, 10 Drawing Sheets

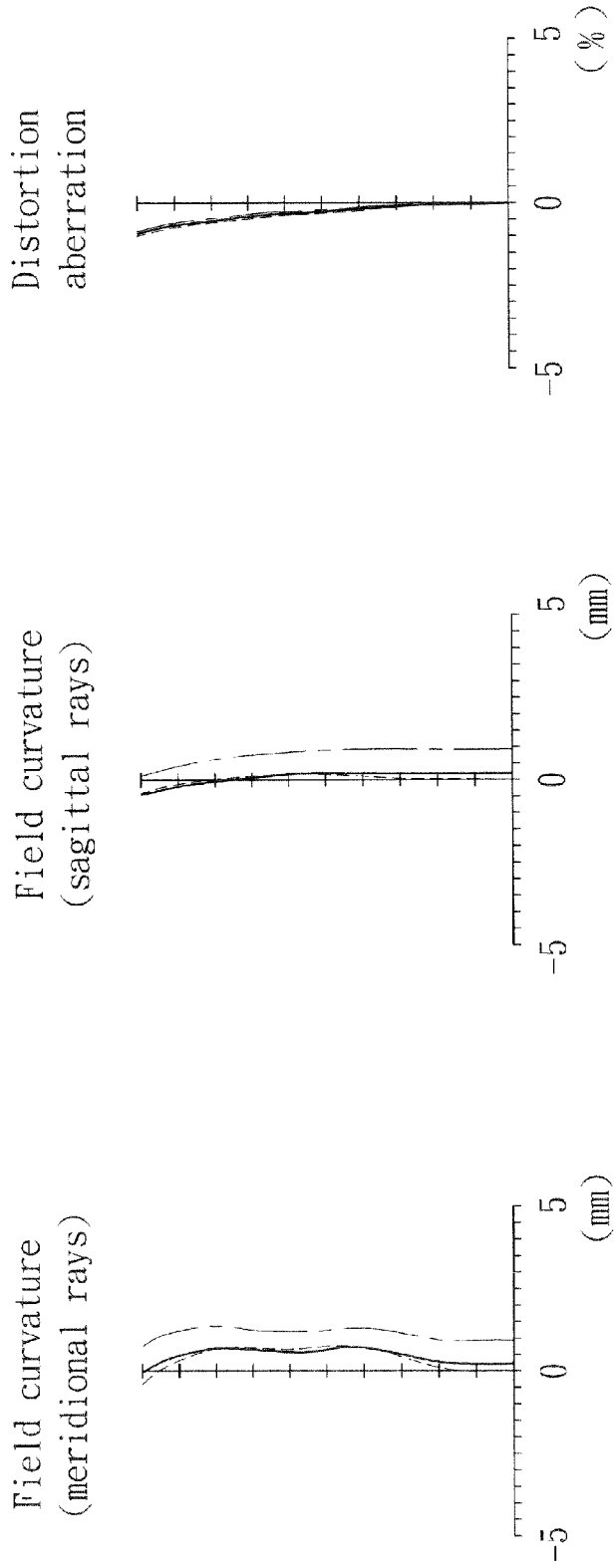

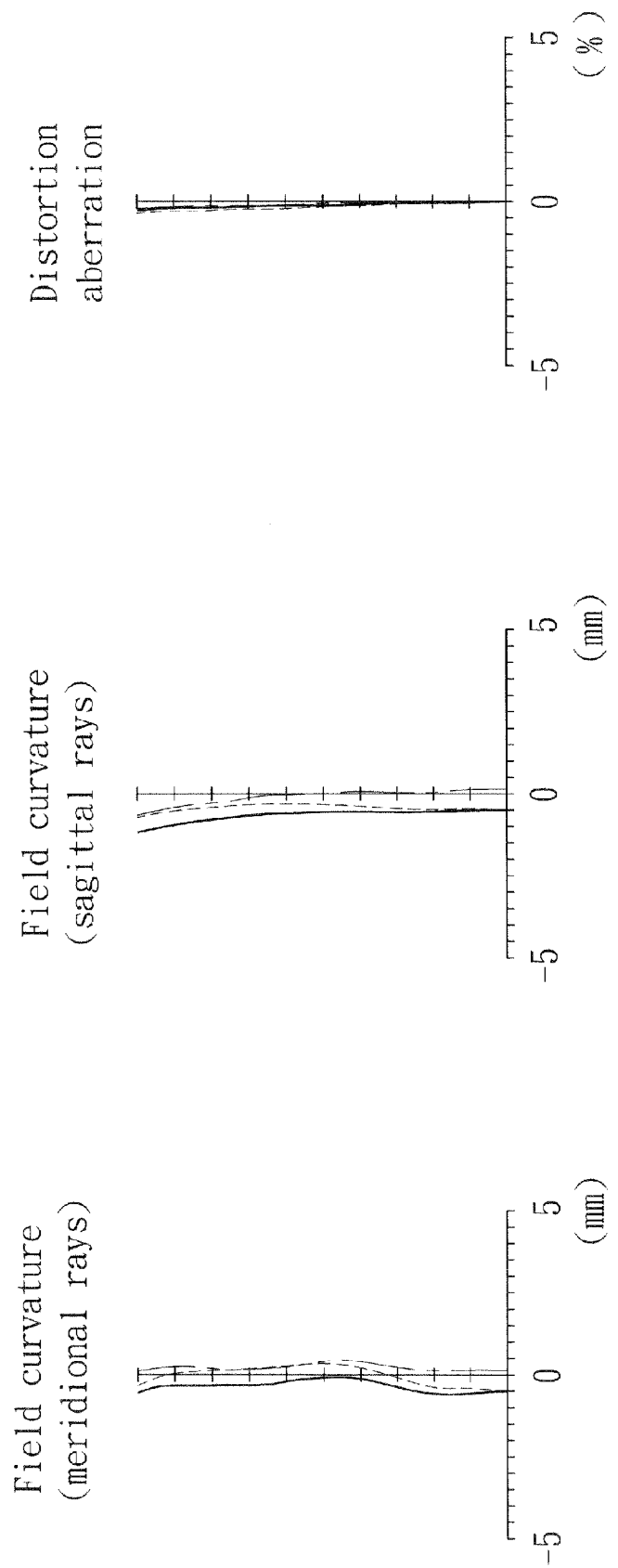

ZOOM PROJECTION LENS

CROSS-REFERENCE TO RELATED APPLICATION

This application claims priority of Taiwanese Application No. 099123630, filed on Jul. 20, 2010.

BACKGROUND OF THE INVENTION

1. Field of the Invention

The present invention relates to an optical lens, more particularly to a zoom projection lens for projector.

2. Description of the Related Art

In recent years, a Cathode Ray Tube (CRT) projector has been gradually replaced by a Liquid Crystal Display (LCD) projector, a Digital Light Processing (DLP) projector, and other relatively compact projectors.

Accordingly, in a non-telecentric system of the DLP projector, a chief ray is unparallel to an optical axis. A total internal reflection prism may be omitted in a zoom projection lens of the non-telecentric system, compared with a zoom projection lens of a telecentric system, so as to save cost of the zoom projection lens. Moreover, since the chief ray is unparallel to the optical axis in the non-telecentric system, the chief ray enters the zoom projection lens at a nonzero angle with reference to the optical axis. Therefore, a position of a projected image is deviated upwardly, so as to satisfy a requirement of a front-projector.

A conventional front projector with a non-telecentric system is disclosed in Taiwanese Patent No. I288290, which includes a first lens set and a second lens set. The first lens set includes four lenses, and the second lens set includes seven lenses. Owing to a relatively great number of lenses, a cost of the conventional front projector may not be effectively saved, and a length of a zoom projection lens of the conventional front projector may not be reduced such that a need for compact design may not be satisfied.

SUMMARY OF THE INVENTION

Therefore, an object of the present invention is to provide a zoom projection lens that incurs a relatively low cost and that satisfies the need for compact design.

Accordingly, a zoom projection lens of the present invention comprises a first lens set and a second lens set arranged in sequence from an object side to an image side of the zoom projection lens. The first lens set has a negative optical power. The second lens set has a positive optical power. The first lens set consists of a first lens. The second lens set consists of a second lens, a third lens on one side of the second lens opposite to the first lens set, a fourth lens on one side of the third lens opposite to the second lens, and an aperture stop disposed between the second lens and the third lens. The first lens is an aspherical plastic lens. One of the third lens and the fourth lens is an aspherical glass lens. The zoom projection lens satisfies:

$$1.463 < |tt/lt| < 1.505,$$

in which, tt represents an overall length of the zoom projection lens from an object side of the first lens to an imaging plane, and lt represents a length of the zoom projection lens from the object side of the first lens to an image side of the fourth lens.

BRIEF DESCRIPTION OF THE DRAWINGS

Other features and advantages of the present invention will become apparent in the following detailed description of the two preferred embodiments with reference to the accompanying drawings, of which:

FIG. 4 illustrates a wide-angle field curvature plot of meridional rays of the first preferred embodiment;

FIG. 5 illustrates a wide-angle field curvature plot of sagittal rays of the first preferred embodiment;

FIG. 6 illustrates a wide-angle distortion aberration plot of the first preferred embodiment;

FIG. 10 illustrates a telephoto field curvature plot of meridional rays of the first preferred embodiment;

FIG. 11 illustrates a telephoto field curvature plot of sagittal rays of the first preferred embodiment;

FIG. 12 illustrates a telephoto distortion aberration plot of the first preferred embodiment;

DETAILED DESCRIPTION OF THE PREFERRED EMBODIMENTS

Figure 1:
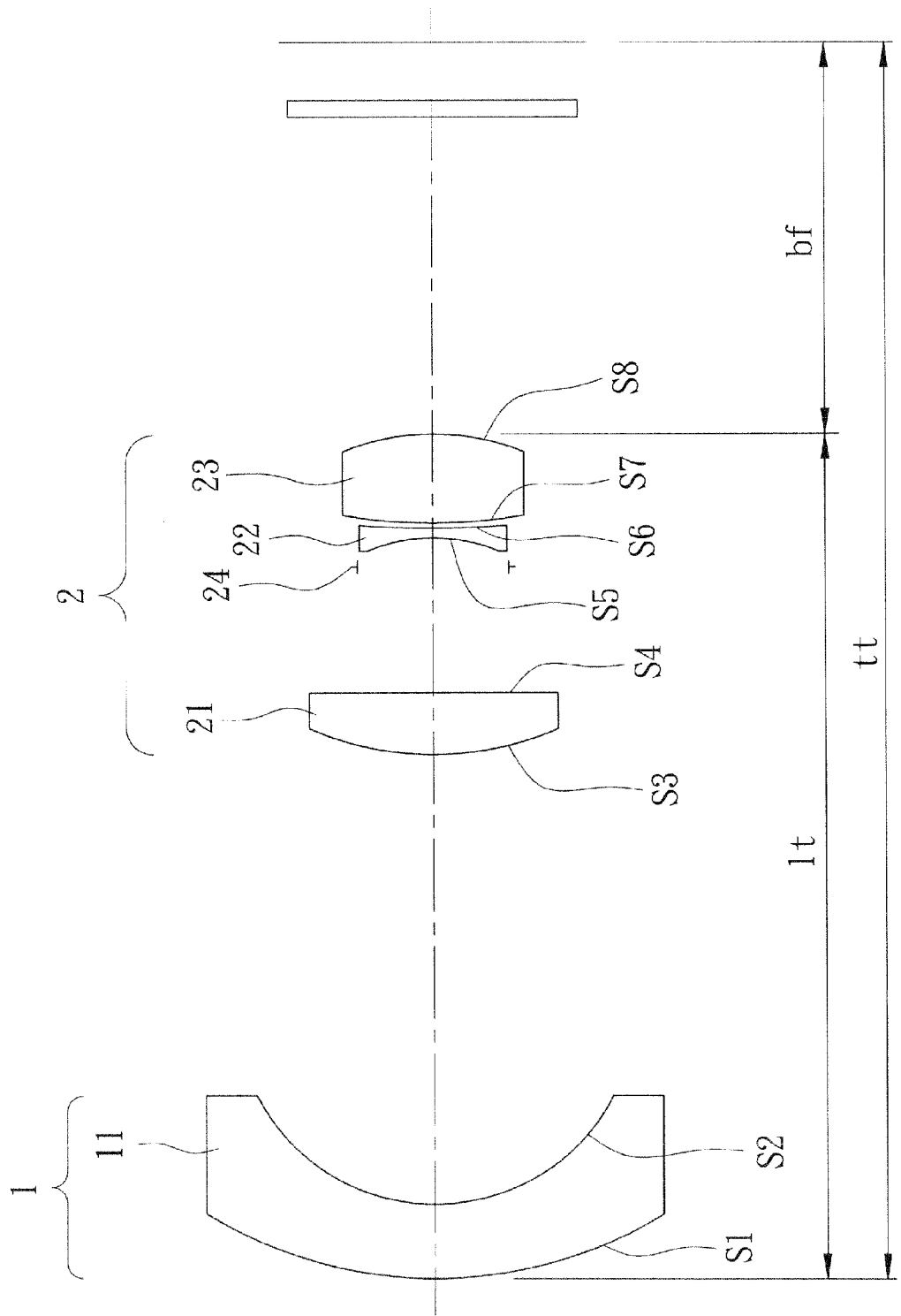
FIG. 1 is a schematic diagram illustrating the first preferred embodiment of a zoom projection lens according to the present invention.

Before the present invention is described in greater detail, it should be noted that like elements are denoted by the same reference numerals throughout the disclosure.

Referring to FIG. 1, the first preferred embodiment of a zoom projection lens, according to the present invention, includes a first lens set 1 and a second lens set 2 arranged in sequence from an object side to an image side of the zoom projection lens. The first lens set 1 has a negative optical power, and the second lens set 2 has a positive optical power.

The first lens set 1 consists of a first lens 11. The first lens 11 is an aspherical plastic lens so as to effectively reduce an overall length of the zoom projection lens from an object side of the first lens 11 to an imaging plane and so as to correct aberrations of a projected image. Furthermore, the first lens 11 is a negative meniscus lens which has a convex surface facing toward the object side of the zoom projection lens.

The second lens set 2 consists of a second lens 21, a third lens 22 on one side of the second lens 21 opposite to the first lens set 1, a fourth lens 23 on one side of the third lens 22 opposite to the second lens 21, and an aperture stop 24 disposed between the second lens 21 and the third lens 22. The second lens 21 has a positive optical power, the third lens 22 has a negative optical power, and the fourth lens 23 has a positive optical power. The second lens 21 is a spherical glass lens. The second lens 21 may be a plano-convex lens or a positive meniscus lens which has a convex surface facing toward the object side of the zoom projection lens. The third lens 22 is a biconcave lens. The fourth lens 23 is a biconvex lens. One of the third lens 22 and the fourth lens 23 is an aspherical glass lens, so as to correct the aberrations of the projected image and so as to increase a back focal length of the zoom projection lens.

The zoom projection lens merely consists of four lenses. Therefore, the number of lenses is reduced so as to save cost of the zoom projection lens and so to satisfy a need for compact design. In regard to environmental temperature variation, an interval length between the first lens set 1 and the second lens set 2, or the back focal length of the zoom projection lens may be adjusted so as to correct aberrations of the projected image resulting from the environmental temperature variation.

The zoom projection lens according to the present invention satisfies the following optical conditions:

$|f1/f2| \leq 1.59$            (1)

$0.696 < |(f1+f2)/fw| < 0.$            (2)

$2.985 < |tt/bf| < 3.161$            (3)

$1.463 < |tt/lt| < 1.505$            (4)

$1.311 < |ex/bf| < 1.383$            (5)

in which, f1 represents a focal length of the first lens set 1, f2 represents a focal length of the second lens set 2, fw represents a wide-angle focal length of the zoom projection lens, ft represents an overall length of the zoom projection lens from the object side of the first lens 11 to the imaging plane, bf represents the back focal length of the zoom projection lens, lt represents a length of the zoom projection lens from the object side of the first lens 11 to an image side of the fourth lens 23, and ex represents an exit pupil position of an optical system of the zoom projection lens.

By satisfying the optical conditions (1) and (2), the overall length tt of the zoom projection lens may effectively reduced, and the aberrations of the projected image may be corrected. By satisfying the optical condition (3), the back focal length bf of the zoom projection lens may be effectively increased. By satisfying the optical conditions (4) and (5), the overall length tt of the zoom projection lens may be further reduced, and the back focal length bf of the zoom projection lens may be further increased. Reduction in the overall length tt of the zoom projection lens may satisfy the need for compact design, and increase in the back focal length bf of the zoom projection length may raise zoom ratio of the zoom projection lens from wide-angle to telephoto.

Table 1 shows optical parameters of the first preferred embodiment of the zoom projection lens according to the present invention. Each of the first, second, third, fourth lenses 11, 21, 22, 23 has an object-side surface S1, S3, S5, S7 facing toward the object side of the zoom projection lens, and an image-side surface S2, S4, S6, S8 facing toward the image side of the zoom projection lens.

In the first preferred embodiment, the second lens 21 is a plano-convex lens, the third lens 22 is a spherical glass lens, and the fourth lens 23 is an aspherical glass lens. The focal length f1 of the first, lens set 1 is −41.6498 mm, the focal length f2 of the second lens set 2 is 26.1888 mm, the wide-angle focal length fw of the zoom projection lens is 21.1343 mm, the overall length tt of the zoom projection lens from the object side of the first lens 11 to the imaging plane is 82 mm, the back focal length bf of the zoom projection lens is 25.9446 mm, the length it of the zoom projection lens from the object side of the first lens 11 to the image side of the fourth lens 23 is 56.0554 mm, and the exit pupil position ex of the zoom projection lens is −34.0751 mm, such that the optical conditions (1) to (5) are satisfied.

Moreover, each of a wide-angle F-number, middle-state F-number, and a telephoto F-number of the zoom projection lens is 2.64, 2.70 and 2.75, respectively. Each of a wide-angle focal length, a middle-state focal length and a telephoto focal length of the zoom projection lens is 21.1343 mm, 22.1594 mm and 23.0025 mm, respectively.

TABLE 1

| Surface | Radius of curvature (mm) | Thickness (mm) | Refractive Index | Abbe Number |
|---|---|---|---|---|
| S1 | 13.85 | 4.87 | | |
| S2 | 7.46 | 29.91543 (wide-angle) 27.527784 (middle-state) 25.723793 (telephoto) | 1.524670 | 56.40 |
| S3 | 19.74 | 4 | 1.772499 | 49.60 |
| S4 | infinity | 10.38 | | |
| S5 | −12.26 | 0.6 | 1.846659 | 23.78 |
| S6 | 64.27 | 0.24 | | |
| S7 | 28 | 6.05 | 1.801910 | 40.89 |
| S8 | −14.25 | 21 | | |

A surface of an aspherical lens may be defined by the following equation:

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + E_{12} \cdot H^{12} + E_{14} \cdot H^{14} + E_{16} \cdot H^{16}$$

in which, D represents a displacement of the surface along an optical axis direction from a vertex of the surface at a distance H from the optical axis, K represents conic coefficient, C represents a reciprocal of a radius curvature of the surface, and $E_4$ to $E_{16}$ represent higher-order aspherical surface coefficients. Tables 1-2, 1-3 show conic coefficient K, and higher-order aspherical surface coefficients $E_4$ to $E_{16}$ of each of the object-side surface S1 and the image-side surface S2 of the first lens 11, and the object-side surface 37 and the image-side surfaces 38 of the fourth lens 23.

TABLE 1-2

| Surface | K | $E_4$ | $E_6$ | $E_8$ |
|---|---|---|---|---|
| S1 | −1.20743 | −7.25E−05 | −2.38E−07 | 2.51E−09 |
| S2 | −0.75808 | −0.00018 | −7.23E−07 | 4.68E−09 |
| S7 | −16.211 | 0.000109 | −3.25E−08 | 5.79E−08 |
| S8 | −5.26565 | −0.00014 | −2.42E−06 | −7.46E−11 |

TABLE 1-3

| Surface | $E_{10}$ | $E_{12}$ | $E_{14}$ | $E_{16}$ |
|---|---|---|---|---|
| S1 | −5.24E−12 | 1.97E−14 | 1.13E−16 | −1.53E−19 |
| S2 | 4.50E−11 | −8.74E−13 | 4.77E−15 | −9.42E−18 |
| S7 | −1.16E−09 | 1.08E−11 | 0 | 0 |
| S8 | 1.44E−12 | 4.69E−12 | 0 | 0 |

Figure 2:
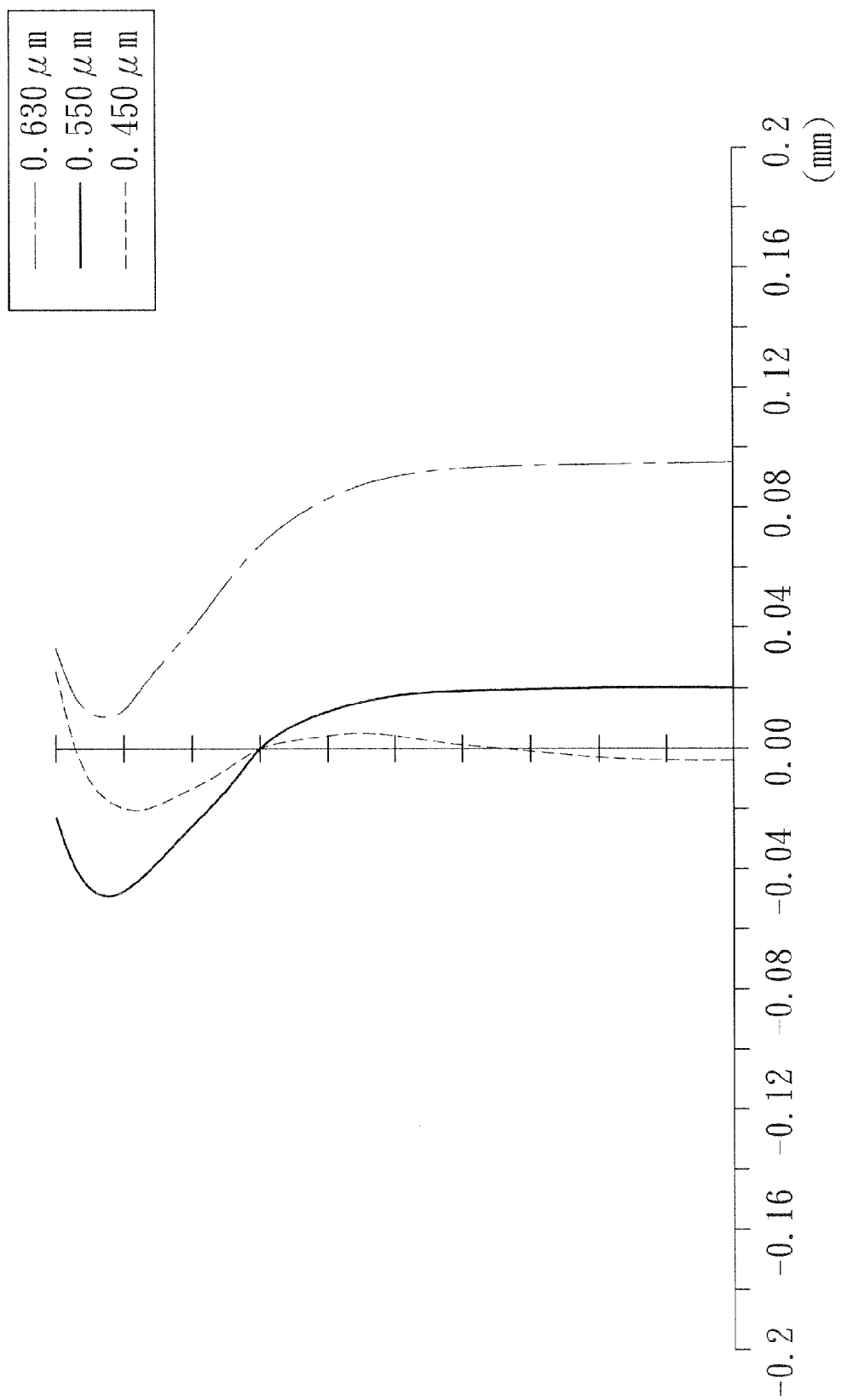
FIG. 2 illustrates a wide-angle longitudinal spherical aberration plot of the first preferred embodiment.
Figure 3:
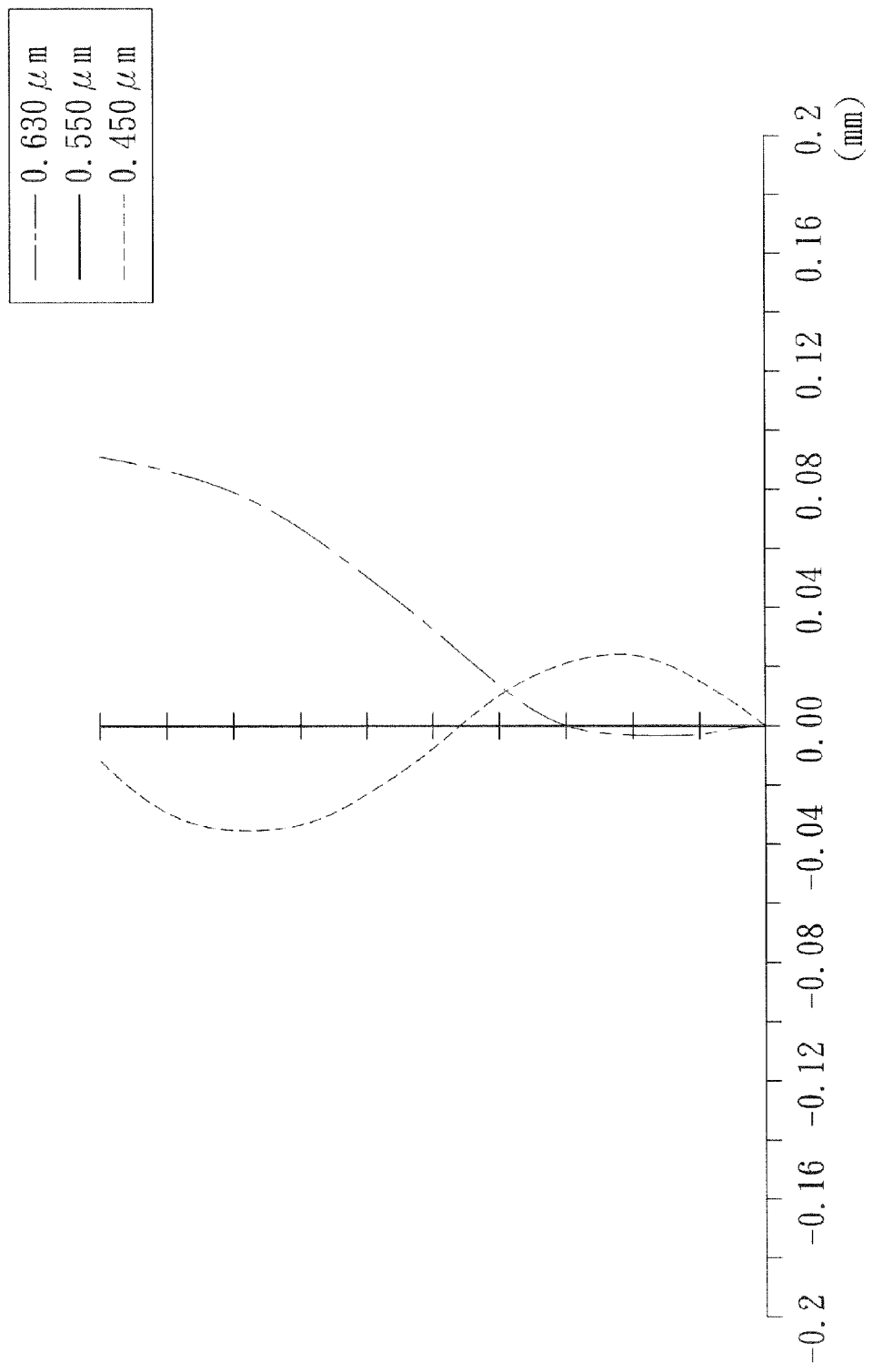
FIG. 3 illustrates a wide-angle lateral color aberration plot of the first preferred embodiment.
Figure 7:
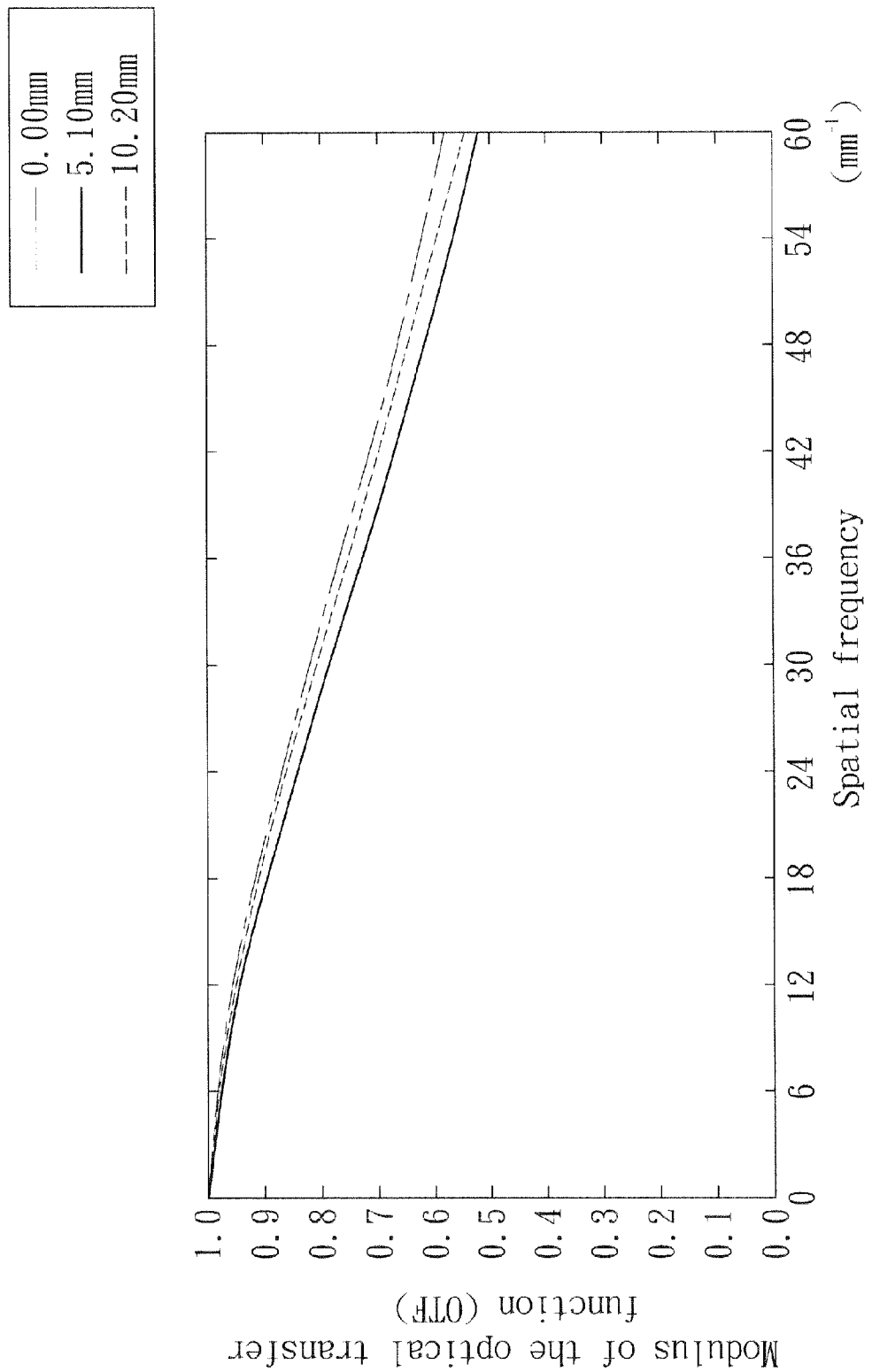
FIG. 7 is a wide-angle modulation transfer function (Nib) plot of the first preferred embodiment.
Figure 8:
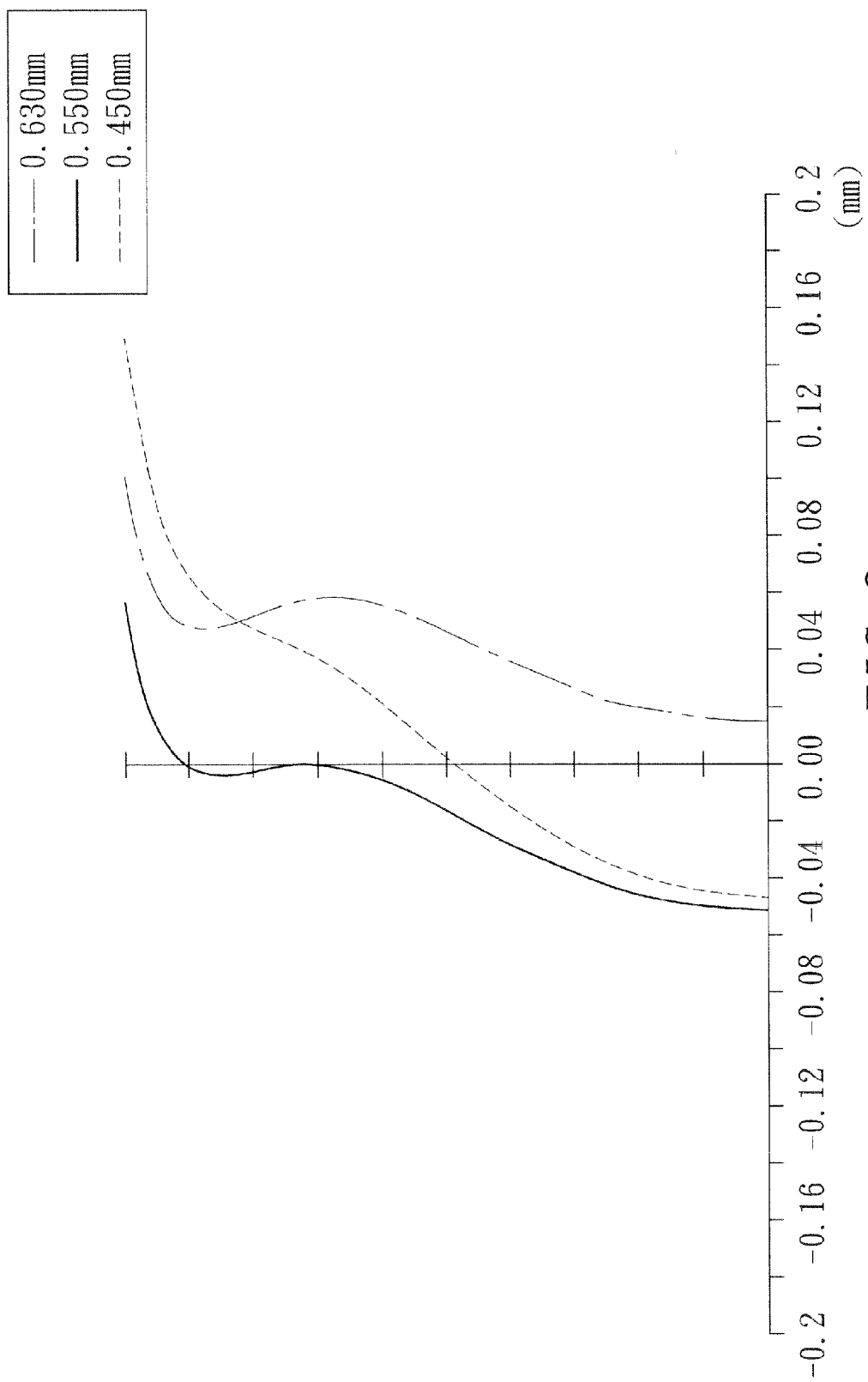
FIG. 8 illustrates a telephoto longitudinal spherical aberration plot of the first preferred embodiment.
Figure 9:
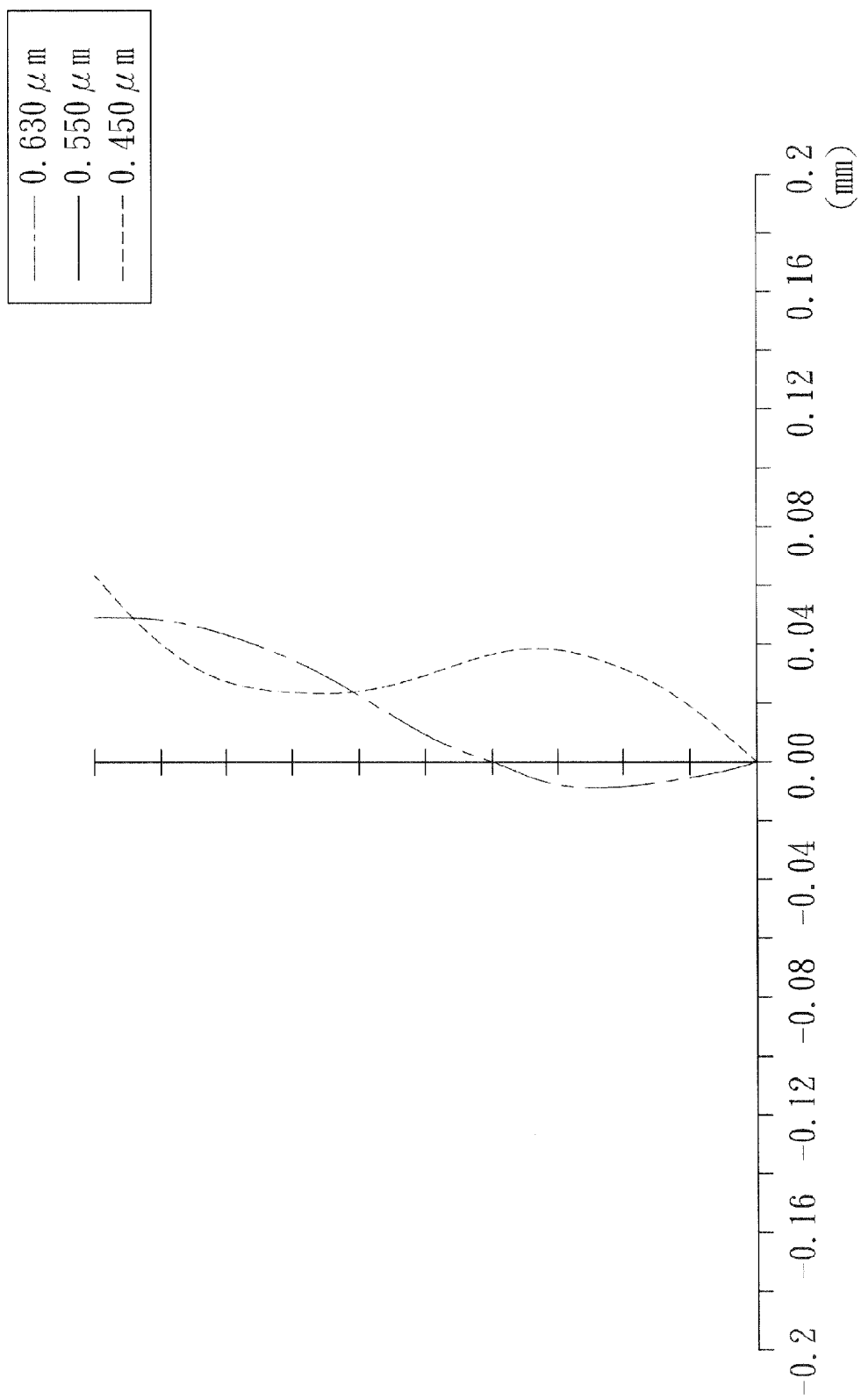
FIG. 9 illustrates a telephoto lateral color aberration plot of the first preferred embodiment.
Figure 13:
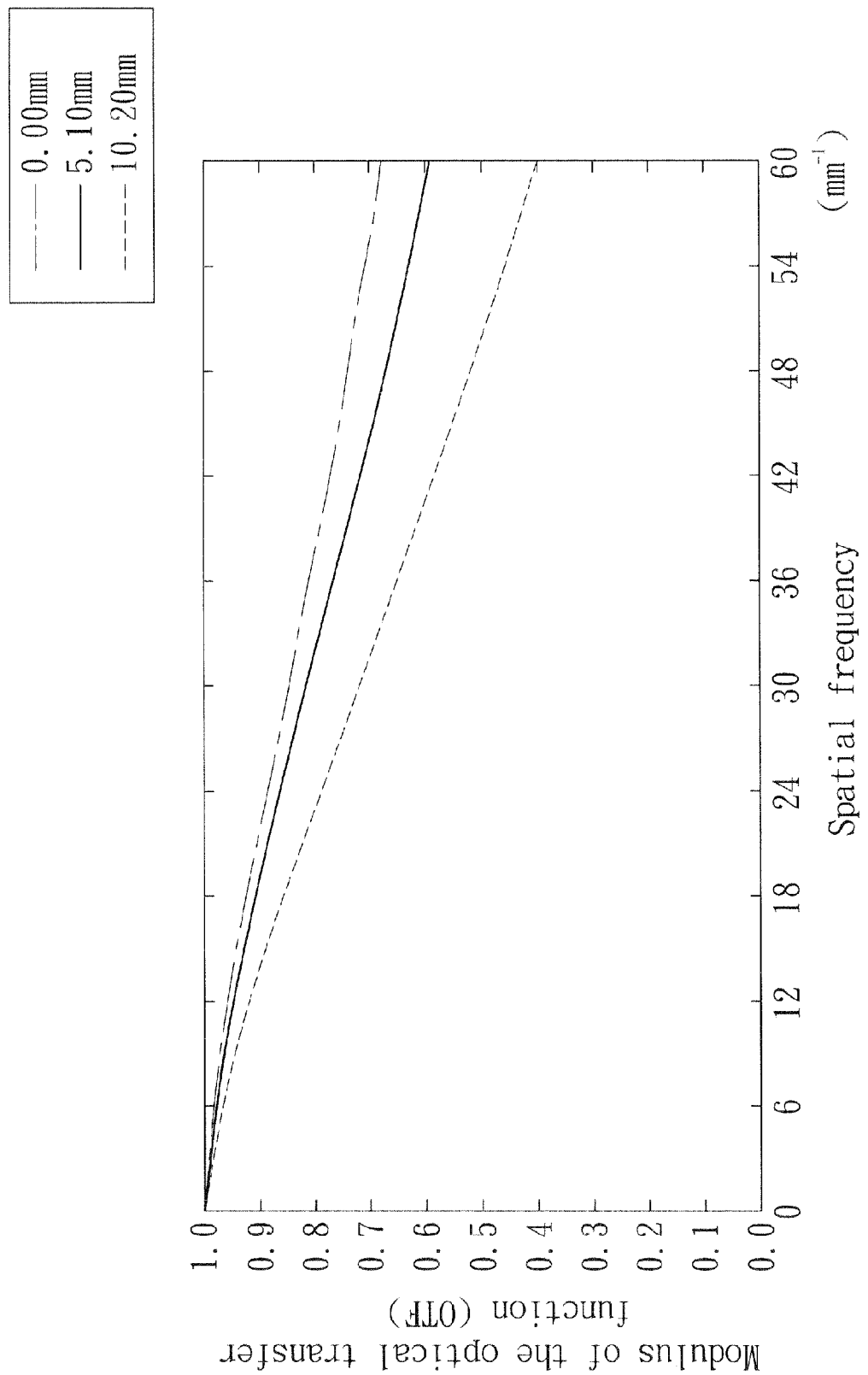
FIG. 13 is a telephoto modulation transfer function (MTF) plot of the first preferred embodiment.

A wide-angle longitudinal spherical aberration plot of the first preferred embodiment is illustrated in FIG. 2, in which a pupil radius is 4.0576 mm. A wide-angle lateral color aberration plot of the first preferred embodiment is illustrated n FIG. 3, in which a maximum image height along a vertical axis is 20.4 mm. Each of FIG. 4 and FIG. 5 is a field curvature plot which illustrates astigmatism for representing imaging positions at different heights. FIG. 4 illustrates astigmatism of meridional rays. FIG. 5 illustrates astigmatism of sagittal rays. In FIG. 4 and FIG. 5, the abscissa represents a distance from an image point to an ideal imaging plane, and the ordinate represents an ideal image height. FIG. 6 is a wide-angle distortion aberration plot illustrating transverse magnification. In FIG. 6, the abscissa represents percentage variation from the image point to an ideal image point, and the ordinate represents the ideal image height. FIG. 7 is a wide-angle modulation transfer function (MTF) plot of the first preferred embodiment, illustrating modulus of the optical transfer function (OTF) which corresponds to variation in spatial frequency.

Each of a telephoto longitudinal spherical aberration plot, a telephoto lateral color aberration plot, a telephoto field curvature plot of meridional rays, a telephoto field curvature plot of sagittal rays, a telephoto distortion aberration plot, and a telephoto modulation transfer function (MTF) plot of the first preferred embodiment is illustrated from FIG. 8 to FIG. 13, respectively.

Figure 14:
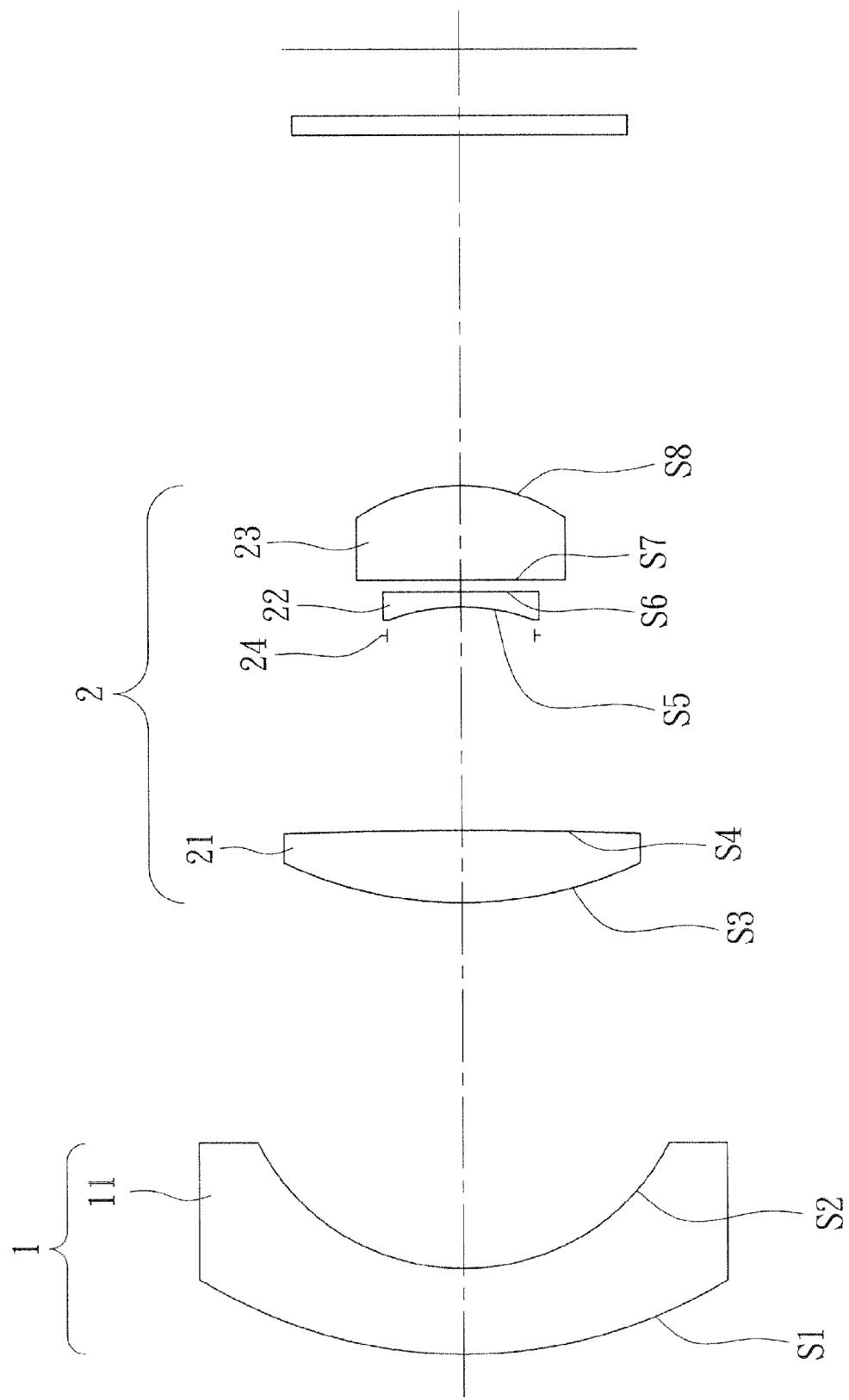
FIG. 14 is a schematic diagram illustrating the second preferred embodiment of the zoom projection lens according to the present invention.

Table 2 shows optical parameters of the second preferred embodiment of the zoom projection lens according to the present invention. As shown in FIG. 14, the second lens 21 is a biconvex lens. The third lens 22 is an aspherical glass lens. The fourth lens 23 is a spherical glass lens. The focal length f1 of the first, lens set 1 is −41.4927 mm, the focal length f2 of the second lens set 2 is 26.7895 mm, the wide-angle focal length fw of the zoom projection lens is 21.1367 mm, the overall length Lt of the zoom projection lens from the object side of the first lens 11 to the imaging plane is 77.4095 mm, the back focal length bf of the zoom projection lens is 25.9365 mm, the length lt of the zoom projection lens from the object side of the first lens 11 to the image side of the fourth lens 23 is 51.4730 mm, and the exit pupil position ex of the zoom projection lens is −35.8658 mm, such that the optical conditions (1) to (5) are satisfied.

Moreover, each of the wide-angle F-number, the middle-state F-number, and the telephoto F-number of the zoom projection lens is 2.64, 2.70 and 2.76, respectively. Each of the wide-angle focal length, the middle-state focal length and the telephoto focal length of the zoom projection lens is 21.1367 mm, 22.1754 mm and 23.1736 mm, respectively.

TABLE 2

| Surface | Radius of curvature (mm) | Thickness (mm) | Refractive Index | Abbe Number |
|---|---|---|---|---|
| S1 | 13.69428 | 4.595745 | | |
| S2 | 7.444151 | 22.17632 (wide-angle) 19.713044 (middle-state) 17.553881 (telephoto) | 1.524670 | 56.40 |
| S3 | 25.42443 | 4.37612 | 1.772499 | 49.60 |
| S4 | −163.263 | 13.2237 | | |
| S5 | −14.1112 | 0.652145 | 1.846630 | 23.59 |
| S6 | 104.4594 | 0.807832 | | |
| S7 | 136.4019 | 5.641069 | 1.788001 | 47.39 |
| S8 | −11.057 | 21 | | |

Tables 2-2, 2-3 show conic coefficient K, and higher-order aspherical surface coefficients $E_4$ to $E_{16}$ of each of the object-side surface S1 and the image-side surface S2 of the first lens 11, and the object-side surface S5 and the image-side surfaces S6 of the third lens 22.

TABLE 2-2

| Surface | K | $E_4$ | $E_6$ | $E_8$ |
|---|---|---|---|---|
| S1 | −1.27771 | −7.47E−05 | −2.29E−07 | 2.60E−09 |
| S2 | −0.75648 | −0.00018 | −7.48E−07 | 5.02E−09 |
| S5 | 1.123433 | −0.00011 | −1.22E−06 | −5.44E−08 |
| S6 | 28.72098 | 3.21E−05 | −5.91E−07 | 2.04E−08 |

TABLE 2-3

| Surface | $E_{10}$ | $E_{12}$ | $E_{14}$ | $E_{16}$ |
|---|---|---|---|---|
| S1 | −5.71E−12 | −2.02E−14 | 1.19E−16 | −1.62E−19 |
| S2 | 4.42E−11 | −8.83E−13 | 4.79E−15 | −9.41E−18 |
| S5 | 4.79E−09 | −1.50E−10 | 0 | 0 |
| S6 | −2.43E−10 | −6.50E−12 | 0 | 0 |

The effects of the present invention may be summarized as follows:

1. The first lens 11 is the aspherical plastic lens, so as to effectively reduce the overall length of the zoom projection lens and so as to correct the aberrations of the projected image.

2. One of the third lens 22 and the fourth lens 23 is the aspherical glass lens, thereby correcting the aberrations of the projected image and increasing the back focal length of the zoom projection lens.

3. The zoom projection lens consists of four lenses. Therefore, the number of lenses is reduced so as to save cost of the zoom projection lens and so as to satisfy the need for compact design.

4. By satisfying the optical conditions (1) to (5), the overall length tt of the zoom projection lens may be reduced so as to satisfy the need for compact design, and the back focal length bf of the zoom projection lens may be increased so as to raise zoom ratio of the zoom projection lens from wide-angle to telephoto.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A zoom projection lens comprising a first lens set and a second lens set arranged in sequence from an object side to an image side of said zoom projection lens,
wherein said first lens set has a negative optical power, and consists of a first lens;
wherein said second lens set has a positive optical power, and consists of
a second lens,
a third lens on one side of said second lens opposite to said first lens set,
a fourth lens on one side of said third lens opposite to said second lens, and
an aperture stop disposed between said second lens and said third lens;
wherein said first lens is an aspherical plastic lens, one of said third lens and said fourth lens is an aspherical glass lens, and said zoom projection lens satisfies:

$1.463 < |tt/lt| < 1.505$, in which, tt represents an overall length of said zoom projection lens in a wide-angle mode from an object side of said first lens to an imaging plane, and lt represents a length of said zoom projection lens in the wide-angle mode from said object side of said first lens to an image side of said fourth lens; and
wherein said zoom projection lens further satisfies:

$$1.311 < |ex/bf| < 1.383$$

in which, ex represents an exit pupil position of an optical system of said zoom projection lens, and bf represents a back focal length of said zoom projection lens.

2. The zoom projection lens as claimed in claim 1, wherein said zoom projection lens further satisfies:

$$2.985 < |tt/bf| < 3.161.$$

3. The zoom projection lens as claimed in claim 1, wherein said zoom projection lens further satisfies:

$$0.696 < |(f1+f2)/fw| < 0.732$$

in which, f1 represents a focal length of said first lens set, f2 represents a focal length of said second lens set, and fw represents a wide-angle focal length of said zoom projection lens.

4. The zoom projection lens as claimed in claim 1, wherein said zoom projection lens further satisfies:

$$|f1/f2| \leq 1.59$$

in which, f1 represents a focal length of said first lens set, and f2 represents a focal length of said second lens set.

5. The zoom projection lens as claimed in claim 1, wherein said second lens has a positive optical power, said third lens has a negative optical power, and said fourth lens has a positive optical power.

6. The zoom projection lens as claimed in claim 1, wherein said fourth lens is the aspherical glass lens.

7. The zoom projection lens as claimed in claim 1, wherein said third lens is the aspherical glass lens.

8. A zoom projection lens consisting of a first lens set and a second lens set arranged in sequence from an object side to an image side of said zoom projection lens,
wherein said first lens set has a negative optical power, and consists of a first lens;
wherein said second lens set has a positive optical power, and consists of
a second lens,
a third lens on one side of said second lens opposite to said first lens set,
a fourth lens on one side of said third lens opposite to said second lens, and
an aperture stop disposed between said second lens and said third lens; and
wherein said first lens is an aspherical plastic lens, one of said third lens and said fourth lens is an aspherical glass lens, and said zoom projection lens satisfies:

$$1.463 < |tt/lt| < 1.505,$$

in which, tt represents an overall length of said zoom projection lens in a wide-angle mode from an object side of said first lens to an imaging plane, and lt represents a length of said zoom projection lens in the wide-angle mode from said object side of said first lens to an image side of said fourth lens.

9. The zoom projection lens as claimed in claim 8, wherein said zoom projection lens further satisfies:

$$1.311 < |ex/bf| < 1.383$$

in which, ex represents an exit pupil position of an optical system of said zoom projection lens, and bf represents a back focal length of said zoom projection lens.

10. The zoom projection lens as claimed in claim 8, wherein said zoom projection lens further satisfies:

$$2.985 < |tt/bf| < 3.161$$

in which, bf represents a back focal length of said zoom projection lens.

11. The zoom projection lens as claimed in claim 8, wherein said zoom projection lens further satisfies:

$$0.696 < |(f1+f2)/fw| < 0.732$$

in which, f1 represents a focal length of said first lens set, f2 represents a focal length of said second lens set, and fw represents a wide-angle focal length of said zoom projection lens.

12. The zoom projection lens as claimed in claim 8, wherein said zoom projection lens further satisfies:

$$|f1/f2| \leq 1.59$$

in which, f1 represents a focal length of said first lens set, f2 represents a focal length of said second lens set.

13. The zoom projection lens as claimed in claim 8, wherein said second lens has a positive optical power, said third lens has a negative optical power, and said fourth lens has a positive optical power.

14. The zoom projection lens as claimed in claim 8, wherein said fourth lens is the aspherical glass lens.

15. The zoom projection lens as claimed in claim 8, wherein said third lens is the aspherical glass lens.

* * * * *